(12) United States Patent
Watanabe et al.

(10) Patent No.: US 6,917,292 B2
(45) Date of Patent: Jul. 12, 2005

(54) RADIO-FREQUENCY IDENTIFICATION SYSTEM, METHOD OF CARRYING OUT RADIO-FREQUENCY IDENTIFICATION, AND PROGRAM FOR RADIO-FREQUENCY IDENTIFICATION

(75) Inventors: Katsumi Watanabe, Kanagawa (JP); Yuji Sato, Kanagawa (JP)

(73) Assignee: NEC Electronics Corporation (JP)

( * ) Notice: Subject to any disclaimer, the term of this patent is extended or adjusted under 35 U.S.C. 154(b) by 0 days.

(21) Appl. No.: 10/789,608

(22) Filed: Feb. 27, 2004

(65) Prior Publication Data

US 2004/0178886 A1 Sep. 16, 2004

(30) Foreign Application Priority Data

Feb. 27, 2003  (JP) ........................................ 2003-050967

(51) Int. Cl.$^7$ .............................................. G08B 13/14
(52) U.S. Cl. ................ 340/572.2; 340/505; 340/539.1; 340/572.1; 340/10.1
(58) Field of Search .............................. 340/572.2, 505, 340/539.1, 539.11, 539.21, 572.1, 10.1, 10.5

(56) References Cited

U.S. PATENT DOCUMENTS

| | | | | |
|---|---|---|---|---|
| 5,591,951 A | * | 1/1997 | Doty | ........................ 340/10.3 |
| 5,627,544 A | * | 5/1997 | Snodgrass et al. | ............ 342/42 |
| 5,959,568 A | * | 9/1999 | Woolley | ...................... 342/42 |
| 6,104,279 A | * | 8/2000 | Maletsky | ................. 340/10.41 |
| 6,282,186 B1 | * | 8/2001 | Wood, Jr. | ................... 370/346 |
| 6,307,847 B1 | * | 10/2001 | Wood, Jr. | ................... 370/329 |
| 6,499,656 B1 | * | 12/2002 | Marsh et al. | ............... 235/375 |

FOREIGN PATENT DOCUMENTS

JP  3051561  3/2000

* cited by examiner

*Primary Examiner*—Daryl C Pope
(74) *Attorney, Agent, or Firm*—Ostrolenk, Faber, Gerb & Soffen, LLP

(57) ABSTRACT

A radio-frequency identification system includes (a) responders each having a unique identification number, (b) an interrogator making an inquiry to and receiving a response from each of the responders, and (c) a host computer controlling communication made between the responders and the interrogator, and binary-searching a number space of the identification number of each of the responders for identifying a responder(s) existing in a communication area in which the responders and the interrogator can make communication with each other. The host computer has a function of acting as a discriminator for generating a control signal in accordance with first to N-th ($N \geq 2$) communication areas in each of which the responders and the interrogator can make communication with each other, binary-searching the number space in each of the first to N-th communication areas one by one to identify a responder(s) existing therein, and inactivating the thus identified responder(s).

29 Claims, 11 Drawing Sheets

RADIO-FREQUENCY IDENTIFICATION SYSTEM, METHOD OF CARRYING OUT RADIO-FREQUENCY IDENTIFICATION, AND PROGRAM FOR RADIO-FREQUENCY IDENTIFICATION

BACKGROUND OF THE INVENTION

1. Field of the Invention

The invention relates to a RFID (Radio-Frequency IDentification) system, and more particularly to a RFID system which binary-searches a number space of each of responders to thereby identify a responder(s) existing in a communication area in which an interrogator can make communication with the responder(s).

2. Description of the Related Art

A RFID system has been conventionally used for controlling communication made between each of a plurality of responders each of which has a unique identification number, and makes a response in radio-frequency communication to an inquiry transmitted from a later mentioned interrogator, and an interrogator which makes an inquiry to each of the responders, and receives the response from each of the responders, and further for identifying a responder or responders existing in a communication area in which the responders and the interrogator can make communication with each other. Each of the responders is fabricated in a quite small size by means of a semiconductor integrated circuit chip, and is designed to be able to operate even by power extracted out of received radio-signals. Such a responder is called a non-contact type IC card, an IC tag, a radio-wave tag or a transponder, for instance, and is attached to or held with an object to be identified.

FIG. 1 is a block diagram of a conventional RFID system.

The illustrated RFID system is comprised of a plurality of responders 103 to 106, an interrogator 20, and a host computer 30.

Each of the responders 103 to 106 is fabricated in a quite small size by means of a semiconductor integrated circuit chip, and is designed to be able to operate even by power extracted out of received radio-signals. Each of the responders 103 to 106 stores therein an identification number unique thereto, and receives an inquiry from the interrogator 20 in radio-frequency communication through a built-in antenna which inquiry includes search conditions for designating a communication area in which a number area of an identification number is to be searched. If an identification number of a responder matches to the search conditions, the responder transmits a response to the interrogator 20. Then, the responder receives an instruction from the interrogator 20 to inactivate the responder, and thus, inactivates a response to be transmitted therefrom.

It is assumed in the explanation made hereinbelow that the responders 103 to 106 store therein 3-bit identification numbers 001, 011, 101 and 110 unique thereto, respectively, and exist in a communication area R0 in which the interrogator 20 can make radio-signal communication with the responders 103 to 106.

The interrogator 20 receives inquiry data including search conditions, from the host computer 30, and transmits an inquiry based on the received search conditions to each of the responders 103 to 106 in radio-frequency communication. The interrogator 20 receives and detects a response transmitted from the responder 103, 104, 105 or 106 having an identification number matching to the search conditions, and transmits the thus detected response to the host computer 30. Then, the interrogator 20 transmits an instruction to a responder having an identification number matching to the search conditions, based on the inquiry data received from the host computer 30, for inactivating the responder.

The interrogator 20 is sometimes called a scanner, a reader or a radio-signal station.

A program for carrying out radio-frequency identification is installed as a control program in the host computer 30, and thus, the host computer 30 has a function of acting as a discriminator which function is accomplished by software. The host computer 30 (a) controls communication made between a plurality of the responders 103 to 106 and the interrogator 20, (b) transmits inquiry data including search conditions to the interrogator 20, (c) causes the interrogator 20 to transmit an inquiry based on the search conditions, to the responders 103 to 106, (d) transmits an instruction to the responders 103 to 106 to inactivate the responders 103 to 106, and (e) judges whether response numbers received from the responders 103 to 106 are in collision with one another, based on a detection signal output from the interrogator 20, for binary-searching number spaces of the identification numbers to identify a responder or responders existing in the communication area R0 among the responders 103 to 106.

FIG. 2 is a block diagram of a RF block of the interrogator 20 as a part of the RFID system illustrated in FIG. 1.

The RF block of the interrogator 20 is comprised of a signal-receiving antenna 200, a signal-transmitting antenna 201, a first band pass filter (BPF) 202, a power amplifier 203, a modulator 204, an oscillator 205, a second band pass filter 206, a phase shifter 207, a first synchronism detector 208, a first low pass filter 209, a second synchronism detector 210, and a second low pass filter 211.

The oscillator 205 transmits a reference signal to the modulator 204, the first synchronism detector 208, and the second synchronism detector 210.

The modulator 204 receives the reference signal from the oscillator 205 and the inquiry data from the host computer 30. The modulator 204 modulates the reference signal in accordance with the inquiry data, and transmits the thus modulated signal to the power amplifier 203.

The power amplifier 203 amplifies the modulated signal received from the modulator 204, and transmits the thus amplified signal to the first band pass filter 202.

The first band pass filter 202 receives the amplified signal from the power amplifier 203, and restricts a frequency-band of the received signal into a predetermined frequency. Then, the signal is radiated into air as radio-signals through the signal-transmitting antenna 201.

The signal-receiving antenna 200 receives radio-signals, and transmits the received radio-signals to the second band pass filter 206.

The second band pass filter 206 restricts a frequency-band of the received signal into a predetermined frequency, and transmits the signal to the phase shifter 207.

The phase shifter 207 converts a phase of the received signal by 90 degrees, and transmits the originally received signal to the first synchronism detector 208 and the phase-converted signal to the second synchronism detector 210.

The first synchronism detector 208 synchronously detects the signal received from the phase shifter 207, based on the reference signal received from the oscillator 205, for extracting a signal having a necessary frequency. The thus extracted signal is transmitted to the first low pass filter 209. Similarly, the second synchronism detector 210 synchronously detects the phase-converted signal received from the phase shifter 207, based on the reference signal received from the oscillator 205, for extracting a signal having a necessary frequency. The thus extracted signal is transmitted to the second low pass filter 211.

The first low pass filter 209 restricts a frequency band of the signal received from the first synchronism detector 208 into a predetermined frequency, and transmits the thus restricted signal to the host computer 30 as the detection signal. Similarly, the second low pass filter 210 restricts a frequency band of the signal received from the second synchronism detector 210 into a predetermined frequency, and transmits the thus restricted signal to the host computer 30 as the detection signal.

FIG. 3 is a flowchart showing steps to be carried out by the host computer for radio-frequency identification in the RFID system illustrated in FIG. 1.

First, search conditions which designate a communication area in which a number space of an identification number is searched are initialized for turning all bits into indefinite bits X, and all of number spaces are designated, in step S2.

Then, the host computer 30 causes the interrogator 20 to transmit an inquiry made based on the search conditions, to the responders 103 to 106, in step S3.

Then, the host computer 30 causes the interrogator 20 to receive responses from a responder or responders having an identification number matching to the search conditions, in step S4.

Then, the host computer 30 judges whether response numbers received by the interrogator 20 are in collision with one another, in step S5.

If the response numbers are in collision with one another (YES in step S5), a bit which is not in collision with a bit in another response number remains unchanged, and a bit which is in collision with a bit in another response number is reset into a fixed binary number 0 or 1, in step S6. Then, the above-mentioned steps S3 to S5 are repeatedly carried out.

If the response numbers are not in collision with one another (NO in step S5), the host computer 30 stores therein the response number comprised of the identification number of the responder 103, 104, 105 or 106 which exists in the communication area R0, in step S7.

Then, the host computer 30 causes the interrogator 20 to transmit an instruction to the thus identified responder to inactivate itself, in step S8.

Then, the host computer 30 judges whether binary-searching is completed in each of number spaces, in step S9. If completed (YES in step S9), the process of identifying a responder or responders existing in the communication area R0 is finished. If not completed (NO in step S9), the above-mentioned steps S6, S3 to S5, and S7 to S9 are repeatedly carried out.

A detailed operation of the conventional RFID system is explained hereinbelow with reference to FIGS. 1 to 3. It is assumed in the explanation made hereinbelow that the responders 103 to 106 store therein 3-bit identification numbers 001, 011, 101 and 110 unique thereto, respectively, and exist in the communication area R0 in which the interrogator 20 can make radio-signal communication with the responders 103 to 106.

With reference to FIG. 3, the 3-bit search conditions are initialized or reset to turn all of the bits into indefinite bits X, in step S2. Thus, there is obtained the search conditions XXX.

Then, the host computer 30 causes the interrogator 20 to transmit an inquiry made based on the search conditions XXX, to the responders 103 to 106, in step S3.

Since the responders 103 to 106 have the identification number 001, 011, 101 and 110, respectively, matching to the search conditions XXX, the responders 103 to 106 transmit their identification numbers as response numbers to the interrogator 20 in response to the inquiry transmitted from the interrogator 20, in step S4.

As a result, there occurs collision in all of bits 2, 1 and 0 in the response numbers which the interrogator 20 received (YES in step S5). Hence, the host computer 30 newly determines the search conditions, in step S6. Specifically, the bit 2 is changed to a fixed binary number 0, and thus, there is obtained newly determined search conditions 0XX.

Then, the steps S3 to S5 are carried out again. Specifically, the host computer 30 causes the interrogator 20 to transmit an inquiry made based on the search conditions 0XX, to the responders 103 to 106, in step S3.

Since the responders 103 and 104 have the identification number 001 and 011, respectively, matching to the search conditions 0XX, the responders 103 and 104 transmit their identification numbers as response numbers to the interrogator 20 in response to the inquiry transmitted from the interrogator 20, in step S4.

As a result, there occurs collision in the bit 1 in the response numbers which the interrogator 20 received (YES in step S5). Hence, the host computer 30 newly determines the search conditions, in step S6. Specifically, the bits 2 and 0 remain unchanged, and the bit 1 is changed to a fixed binary number 0. Thus, there is obtained newly determined search conditions 00X.

Then, the steps S3 to S5 are carried out again. Specifically, the host computer 30 causes the interrogator 20 to transmit an inquiry made based on the search conditions 00X, to the responders 103 to 106, in step S3.

Since only the responder 103 have the identification number 001 matching to the search conditions 00X, the responder 103 transmits its identification number as a response number to the interrogator 20 in response to the inquiry transmitted from the interrogator 20, in step S4.

Thus, there occurs no collision in the bits 2, 1 and 0 in the response number which the interrogator 20 received (NO in step S5).

Then, the host computer 30 stores therein the response number comprised of the identification number 001 of the responder 103 as an identification number of a responder existing in the communication area R0, in step S7.

Then, the host computer 30 causes the interrogator 20 to transmit an instruction to the responder 103 not to respond to inquiries which the interrogator 20 will transmit, in step S8.

Since all of the identification numbers are not identified yet (NO in step S9), the host computer 30 newly determines the search conditions, in step S6. Specifically, the bit 1 which has been previously changed into a fixed binary number 0 due to the collision is changed to a fixed binary number 1. Thus, there is obtained newly determined search conditions 01X.

Thereafter, the steps S3 to S9 are repeated carried out until the responders 104, 105 and 106 are all identified and inactivated. Thus, identification of all of the responders 103 to 106 existing in the communication area R0 is finished.

Table 1 shows a relation among the search conditions, the response number or the identification number which the interrogator 20 received, a bit at which collision occurs, and the identified responder.

TABLE 1

| Inquiry Transmission No. | Search Conditions | Received Response Number | Bit at which Collision occurs | Identified Responder |
|---|---|---|---|---|
| 1 | XXX | 001, 011, 101, 110 | 2, 1, 0 | |
| 2 | 0XX | 001, 011 | 1 | |
| 3 | 00X | 001 | | 103 |
| 4 | 01X | 011 | | 104 |
| 5 | 1XX | 101, 110 | 1, 0 | |
| 6 | 10X | 101 | | 105 |
| 7 | 11X | 110 | | 106 ALL |

As an example of a conventional RFID system, Japanese Patent No. 3051561 has suggested a non-contact type IC card system in which a responder is attached to a mobile. The system is designed to include a controller which detects a signal received from the non-contact type IC card, and applies feedback control to power transmitted from a radio-signal station such that the detected signal is constant. When the controller receives a final signal from the non-contact type IC card, the controller transmits a control signal to the radio-signal station to reset power transmitted from the radio-signal station. As the mobile is located closer to the radio-signal station, a communication area in which the mobile can make communication with the radio-signal station becomes narrower. This ensures that other mobiles are out of the communication area, and thus, avoids radio interference. Thus, the radio-signal station can start making communication with next mobile, after the completion of communication with the previous mobile.

When a plurality of responders, such as a non-contact type IC card, an IC tag, a radio-signal tag or a transponder, each attached to or held in a mobile exists in a communication area in which the responders and an interrogator can make communication with each other, and moves fast, a RFID system is required to identify very rapidly and at real-time all of the responders existing in the communication area for the purpose of optimal processing. Even if the responders do not move fast, if a lot of responders exist in the communication area, a RFID system is required to do the same.

SUMMARY OF THE INVENTION

Thus, it is an object of the present invention to provide a RFID system which is capable of rapidly identifying a plurality of responders existing in a communication area in which the responders and an interrogator can make communication with each other.

It is also an object of the present invention to provide a method of carrying out radio-frequency identification which method is capable of doing the same as mentioned above.

It is further an object of the present invention to provide a computer program which causes a host computer in a RFID system to act as a discriminator.

In one aspect of the present invention, there is provided a radio-frequency identification system including (a) a plurality of responders each of which has a unique identification number, and makes a response in radio-frequency communication to an inquiry transmitted from a later mentioned interrogator, (b) an interrogator which makes an inquiry to each of the responders, and receives the response from each of the responders, and (c) a host computer which controls communication made between the responders and the interrogator, and binary-searches a number space of the identification number of each of the responders for identifying a responder(s) existing in a communication area in which the responders and the interrogator can make communication with each other, wherein the host computer has a function of acting as a discriminator for generating a control signal in accordance with first to N-th communication areas in each of which the responders and the interrogator can make communication with each other, binary-searching the number space in each of the first to N-th communication areas one by one to identify a responder(s) existing therein, and inactivating the thus identified responder(s), wherein N is a positive integer equal to or greater than two, and the function is accomplished by software.

For instance, the host computer binary-searches the number space in each of the first to N-th communication areas in such an order that a smaller area is selected prior to a larger area, in which case, it is preferable that the smaller area is contained in the larger area.

It is preferable that the interrogator includes a power amplifier which amplifies power in accordance with the control signal to incrementally increase a level of an output signal transmitted from the interrogator.

It is preferable that the interrogator includes a signal-transmitting antenna and a signal-receiving antenna both having directivity, and a rotator rotating the signal-transmitting and signal-receiving antennas in accordance with the control signal for varying a communication area among the first to N-th communication areas.

It is preferable that the interrogator includes a plurality of pairs of a signal-transmitting antenna and a signal-receiving antenna, and a selector which selects one pair of a signal-transmitting antenna and a signal-receiving antenna among the pairs in accordance with the control signal for varying a communication area among the first to N-th communication areas.

It is preferable that the radio-frequency identification system includes a plurality of interrogators, and further includes a selector which selects one of the interrogators in accordance with the control signal for varying a communication area among the first to N-th communication areas.

In another aspect of the present invention, there is provided a method of carrying out radio-frequency identification in a radio-frequency identification system including (A) a plurality of responders each of which has a unique identification number, and makes a response in radio-frequency communication to an inquiry transmitted from a later mentioned interrogator, (B) an interrogator which makes an inquiry to each of the responders, and receives the response from each of the responders, and (C) a host computer which controls communication made between the responders and the interrogator, and binary-searches a number space of the identification number of each of the responders for identifying a responder(s) existing in a communication area in which the responders and the interrogator can make communication with each other, the method including the steps of (a) generating a control signal in accordance with first to N-th communication areas in each of which the responders and the interrogator can make communication with each other, wherein N is a positive integer equal to or greater than two, (b) binary-searching the number space in each of the first to N-th communication areas one by one to identify a responder(s) existing therein, and (c) inactivating the thus identified responder(s), wherein the steps (a), (b) and (c) are carried out by the host computer.

It is preferable that the step (b) is carried out in such an order that a smaller area is selected prior to a larger area, in which case, it is preferable that the smaller area is contained in the larger area.

The method may further include the step of amplifying power in accordance with the control signal to incrementally increase a level of an output signal transmitted from the interrogator.

For instance, the step (b) may be carried out by rotating a signal-transmitting antenna and a signal-receiving antenna of the interrogator in accordance with the control signal for varying a communication area among the first to N-th communication areas, the both signal-transmitting and signal-receiving antennas having directivity.

For instance, the step (b) may be carried out by selecting one pair of a signal-transmitting antenna and a signal-receiving antenna among a plurality of pairs of a signal-transmitting antenna and a signal-receiving antenna of the interrogator in accordance with the control signal for varying a communication area among the first to N-th communication areas.

It is preferable that the radio-frequency identification system includes a plurality of interrogators, and the step (b) is carried out by selecting one of the interrogators in accordance with the control signal for varying a communication area among the first to N-th communication areas.

The method may further include (d-1) initializing the control signal for initializing the first to N-th communication areas, (d-2) initializing binary-search conditions in accordance with which the number space is binary-searched, to turn all of bits into indefinite bits, and designating all of number spaces, (d-3) causing the interrogator to transmit an inquiry made in accordance with the binary-search conditions, to the responders, (d-4) causing the interrogator to receive a response(s) from a responder(s) having an unique identification number matching to the binary-search conditions, (d-5) judging whether response numbers having been received in the interrogator are in collision with one another, (d-6) storing a response number which is not in collision with other response numbers, as an identification number of a responder existing in a communication area in which the responders and the interrogator can make communication with each other, (d-7) transmitting an instruction to the responder to inactivate the responder, (d-8) judging whether binary-searching the number space is completed in accordance with the binary-search conditions, (d-9) if binary-searching the number space is judged in the step (k) to be completed, judging whether binary-searching the number space is completed in all of the first to N-th communication areas, and (d-10) if binary-searching the number space is judged completed in all of the first to N-th communication areas, finishing binary-searching the number space.

The method may further include (e) if the response numbers are judged in the step (d-5) to be in collision with one another, resetting a bit which is in collision with a bit in another response number, into another binary number without resetting a bit which is not in collision with a bit in another response number, and (f) repeating the steps (d-3) to (d-10).

The method may further include (g) if binary-searching the number space is judged in the step (d-8) not to be completed, resetting a bit which is in collision with a bit in another response number, into another binary number without resetting a bit which is not in collision with a bit in another response number, and (h) repeating the steps (d-3) to (d-10).

The method may further include (i) if binary-searching the number space is judged in the step (d-9) not to be completed in all of the first to N-th communication areas, varying the control signal for selecting another area among the first to N-th communication areas, and (j) repeating the steps (d-2) to (d-10).

In still another aspect of the present invention, there is provided a program for causing a computer to control communication made between each of a plurality of responders each of which has a unique identification number, and makes a response in radio-frequency communication to an inquiry transmitted from a later mentioned interrogator, and an interrogator which makes an inquiry to each of the responders, and receives the response from each of the responders, and binary-search a number space of the identification number of each of the responders for identifying a responder(s) existing in a communication area in which the responders and the interrogator can make communication with each other, wherein steps executed by the computer in accordance with the program includes (a) generating a control signal in accordance with first to N-th communication areas in each of which the responders and the interrogator can make communication with each other, wherein N is a positive integer equal to or greater than two, (b) binary-searching the number space in each of the first to N-th communication areas one by one to identify a responder(s) existing therein, and (c) inactivating the thus identified responder(s).

For instance, the step (b) may be carried out in such an order that a smaller area is selected prior to a larger area, in which case, it is preferable that the smaller area is contained in the larger area.

The steps executed by the computer in accordance with the program may further include amplifying power in accordance with the control signal to incrementally increase a level of an output signal transmitted from the interrogator.

For instance, the step (b) may be carried out by rotating a signal-transmitting antenna and a signal-receiving antenna of the interrogator in accordance with the control signal for varying a communication area among the first to N-th communication areas, the both signal-transmitting and signal-receiving antennas having directivity.

For instance, the step (b) may be carried out by selecting one pair of a signal-transmitting antenna and a signal-receiving antenna among a plurality of pairs of a signal-transmitting antenna and a signal-receiving antenna of the interrogator in accordance with the control signal for varying a communication area among the first to N-th communication areas.

For instance, the step (b) may be carried out by selecting one of the interrogators in accordance with the control signal for varying a communication area among the first to N-th communication areas.

The steps executed by the computer in accordance with the program may further include (d-1) initializing the control signal for initializing the first to N-th communication areas, (d-2) initializing binary-search conditions in accordance with which the number space is binary-searched, to turn all of bits into indefinite bits, and designating all of number spaces, (d-3) causing the interrogator to transmit an inquiry made in accordance with the binary-search conditions, to the responders, (d-4) causing the interrogator to receive a response(s) from a responder(s) having an unique identification number matching to the binary-search conditions, (d-5) judging whether response numbers having been received in the interrogator are in collision with one another, (d-6) storing a response number which is not in collision with other response numbers, as an identification number of a responder existing in a communication area in which the responders and the interrogator can make communication with each other, (d-7) transmitting an instruction to the responder to inactivate the responder, (d-8) judging whether binary-searching the number space is completed in accordance with the binary-search conditions, (d-9) if binary-searching the number space is judged in the step (k) to be completed, judging whether binary-searching the number space is completed in all of the first to N-th communication areas, and (d-10) if binary-searching the number space is judged completed in all of the first to N-th communication areas, finishing binary-searching the number space.

The steps executed by the computer in accordance with the program may further include (e) if the response numbers are judged in the step (d-5) to be in collision with one another, resetting a bit which is in collision with a bit in another response number, into another binary number without resetting a bit which is not in collision with a bit in another response number, and (f) repeating the steps (d-3) to (d-10).

The steps executed by the computer in accordance with the program may further include (g) if binary-searching the number space is judged in the step (d-8) not to be completed, resetting a bit which is in collision with a bit in another response number, into another binary number without resetting a bit which is not in collision with a bit in another response number, and (h) repeating the steps (d-3) to (d-10).

The steps executed by the computer in accordance with the program may further include (i) if binary-searching the number space is judged in the step (d-9) not to be completed in all of the first to N-th communication areas, varying the control signal for selecting another area among the first to N-th communication areas, and (j) repeating the steps (d-2) to (d-10).

The advantages obtained by the aforementioned present invention will be described hereinbelow.

The RFID system in accordance with the present invention binary-searched and identifies each of a plurality of responders existing in a communication area in which the responders and an interrogator can make communication with each other. The greater a number of responders to be identified is or the longer a bit length of an identification number of each of responders is, the shorter a period of time necessary for carrying out binary-searching for identification of responders is.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 4:
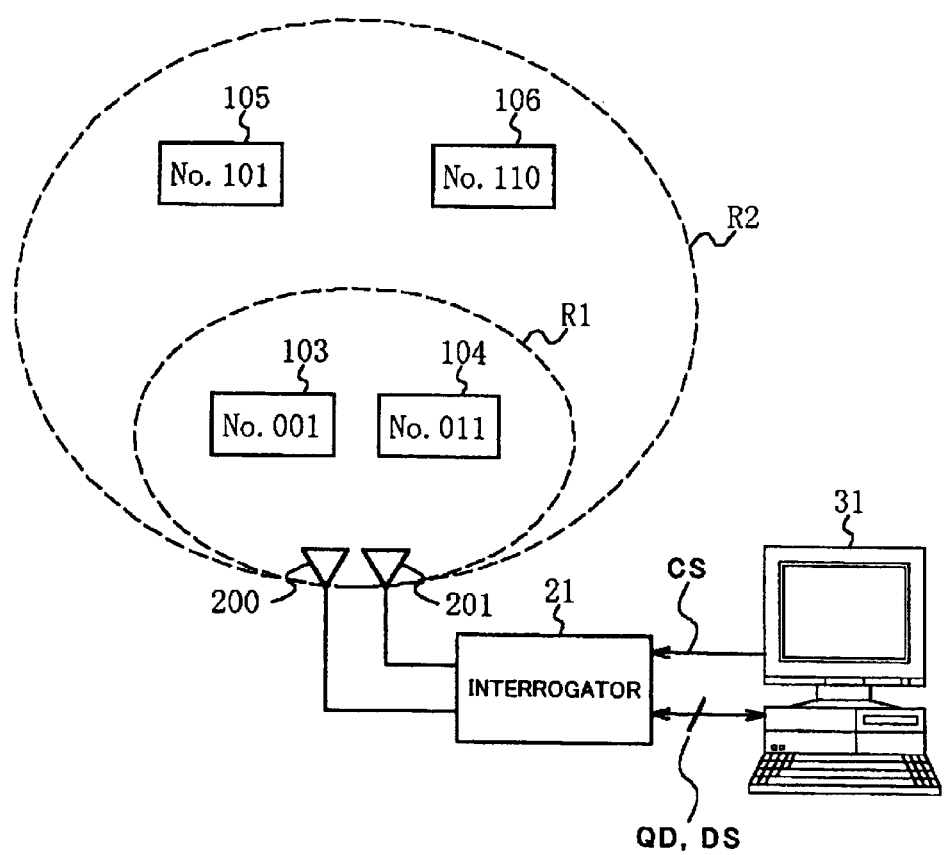
FIG. 4 is a block diagram of the RFID system in accordance with the first embodiment of the present invention.

FIG. 4 is a block diagram of the RFID system in accordance with the first embodiment of the present invention.

The RFID system in accordance with the first embodiment is comprised of a plurality of responders 103 to 106, an interrogator 21, and a host computer 31.

Figure 1:
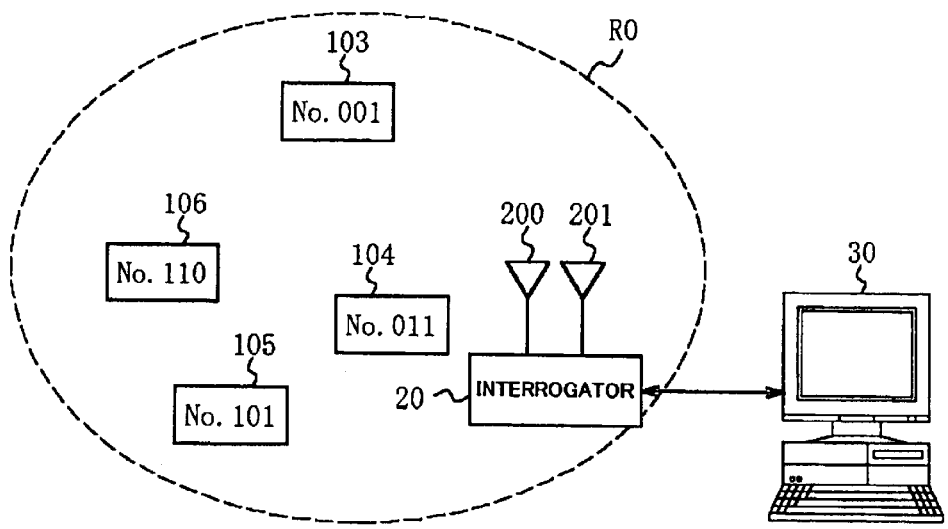
FIG. 1 is a block diagram of a conventional RFID system.

Each of the responders 103 to 106 is fabricated in a quite small size by means of a semiconductor integrated circuit chip, and is designed to be able to operate even by power extracted out of received radio-signals, similarly to the responders 103 to 106 illustrated in FIG. 1. Each of the responders 103 to 106 stores therein an identification number unique thereto, and receives an inquiry from the interrogator 21 in radio-frequency communication through a built-in antenna which inquiry includes search conditions for designating a communication area in which a number area of an identification number is to be searched. If an identification number of a responder matches to the search conditions, the responder transmits a response to the interrogator 21. Then, the responder receives an instruction from the interrogator 21 to inactivate the responder, and thus, inactivates a response to be transmitted therefrom.

It is assumed in the first embodiment that the responders 103 to 106 store therein 3-bit identification numbers 001, 011, 101 and 110 unique thereto, respectively, and the responders 103 and 104 exist in a communication area R1 and the responders 105 and 106 exist in a communication area R2.

Herein, each of the communication areas R1 and R2 indicates a communication area in which an interrogator and a responder make communication with each other. As illustrated in FIG. 4, the communication area R1 is smaller than the communication area R2, and is totally contained in the communication area R2.

The interrogator 21 receives a control signal CS and inquiry data QD including search conditions, from the host computer 31. The interrogator 21 controls an output level at which radio-signals are transmitted, in accordance with the received control signal CS for gradually expand a communication area in which a responder and the interrogator 21 can make communication with each other. Specifically, the interrogator 21 first selects the communication area R1, and then, the communication area R2 larger than the communication area R1, in accordance with the control signal CS.

When the communication area R1 is selected, the interrogator 21 transmits an inquiry based on the received search conditions to each of the responders 103 and 104 in radio-frequency communication. The interrogator 21 receives and detects a response transmitted from the responder 103 or 104 having an identification number matching to the search conditions, and transmits the thus detected response to the host computer 31 as a detection signal DS. Then, the interrogator 21 transmits an instruction to the responder 103 or 104 having an identification number matching to the search conditions, based on the inquiry data received from the host computer 31, for inactivating a response to be transmitted from the responder 103 or 104.

When the communication area R2 is selected subsequently to the communication area R1, the interrogator 21 transmits an inquiry based on the received search conditions to each of the responders 105 and 106 in radio-frequency communication. The interrogator 21 receives and detects a response transmitted from the responder 105 or 106 having an identification number matching to the search conditions, and transmits the thus detected response to the host computer 31 as a detection signal DS. Then, the interrogator 21 transmits an instruction to the responder 105 or 106 having an identification number matching to the search conditions, based on the inquiry data received from the host computer 31, for inactivating a response to be transmitted from the responder 105 or 106.

A program for carrying out radio-frequency identification is installed as a control program in the host computer 31, and thus, the host computer 31 has a function of acting as a discriminator which function is accomplished by software. The host computer 31 produces the control signals CS associated with each of the communication areas R1 and R2. On receipt of the control signal CS associated with the communication area R1, the interrogator 21 forms the communication area R1, whereas on receipt of the control signal CS associated with the communication area R2, the interrogator 21 forms the communication area R2.

The host computer 31 further (a) controls communication made between the responders 103, 104 and the interrogator 21 in the communication area R1 and further between the responders 105, 106 and the interrogator 21 in the communication area R2, (b) transmits the inquiry data QD including the search conditions to the interrogator 21, (c) causes the interrogator 21 to transmit an inquiry based on the search conditions, to the responders 103 to 106, (d) causes the interrogator 21 to transmit an instruction to the responders 103 to 106 to inactivate the responders 103 to 106, and (e) judges whether response numbers received from the responders 103 to 106 are in collision with one another, based on a detection signal DS transmitted from the interrogator 21, for binary-searching number spaces of the identification numbers to identify a responder or responders existing in the communication area R1 or R2 among the responders 103 to 106.

Figure 5:
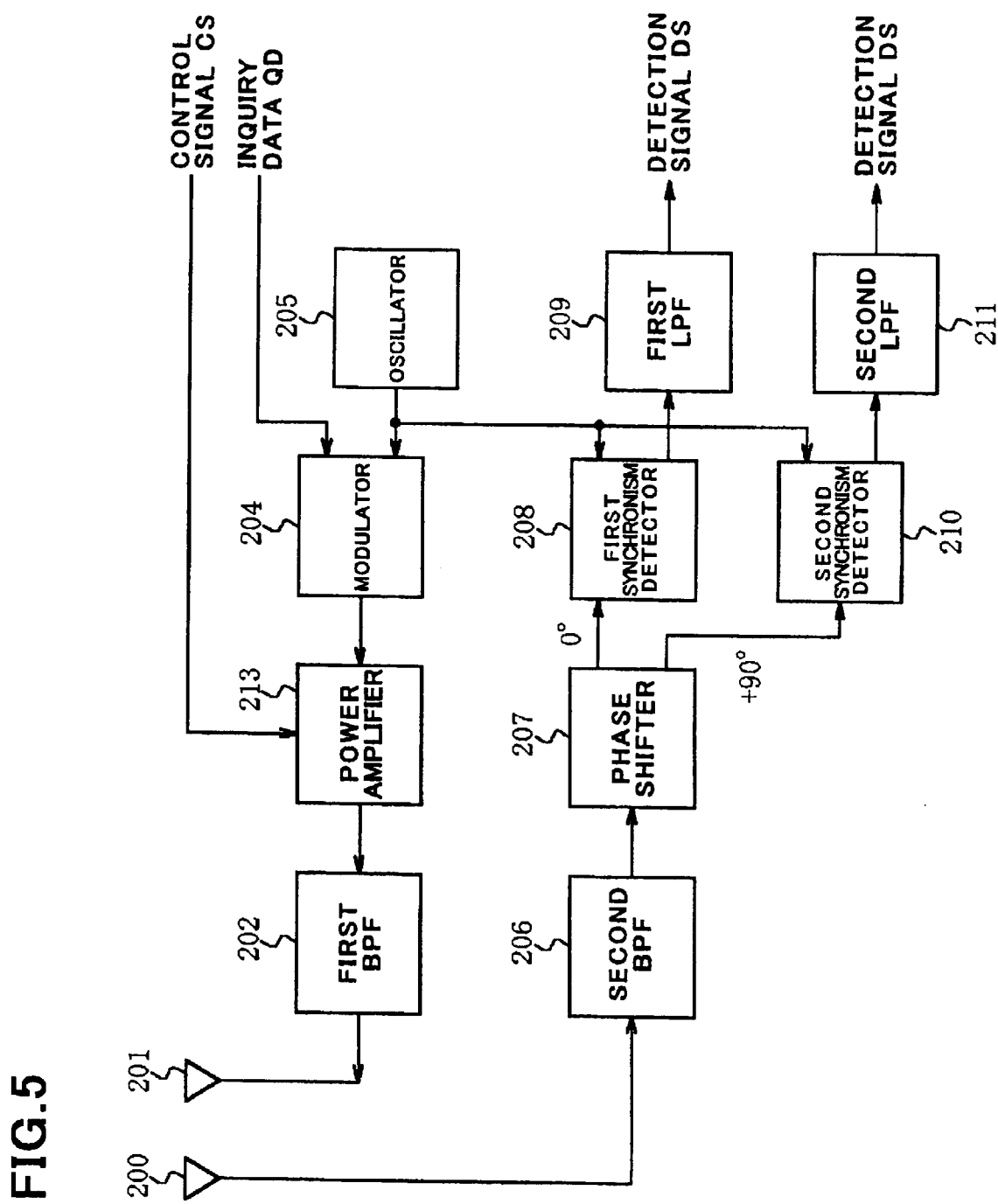
FIG. 5 is a block diagram of a RF block of the interrogator as a part of the RFID system illustrated in FIG. 4.

FIG. 5 is a block diagram of a RF block of the interrogator 21 as a part of the RFID system illustrated in FIG. 4.

The RF block of the interrogator 21 is comprised of a signal-receiving antenna 200, a signal-transmitting antenna 201, a first band pass filter (BPF) 202, a power amplifier 213, a modulator 204, an oscillator 205, a second band pass filter 206, a phase shifter 207, a first synchronism detector 208, a first low pass filter 209, a second synchronism detector 210, and a second low pass filter 211.

The signal-receiving antenna 200, the signal-transmitting antenna 201, the first band pass filter (BPF) 202, the modulator 204, the oscillator 205, the second band pass filter 206, the phase shifter 207, the first synchronism detector 208, the first low pass filter 209, the second synchronism detector 210, and the second low pass filter 211 are designed to have the same structure and operate in the same manner as those in the conventional RFID system illustrated in FIG. 1. Only the power amplifier 213 is structurally different from the corresponding power amplifier 203 in the RF block of the interrogator 20 illustrated in FIG. 2. Hence, only the power amplifier 213 is explained hereinbelow.

The power amplifier 213 amplifies power in accordance with the control signal CS received from the host computer 31 to gradually raise its output level. As a result, the interrogator 21 first forms the communication area R1, and then, the communication area R2.

Figure 6:
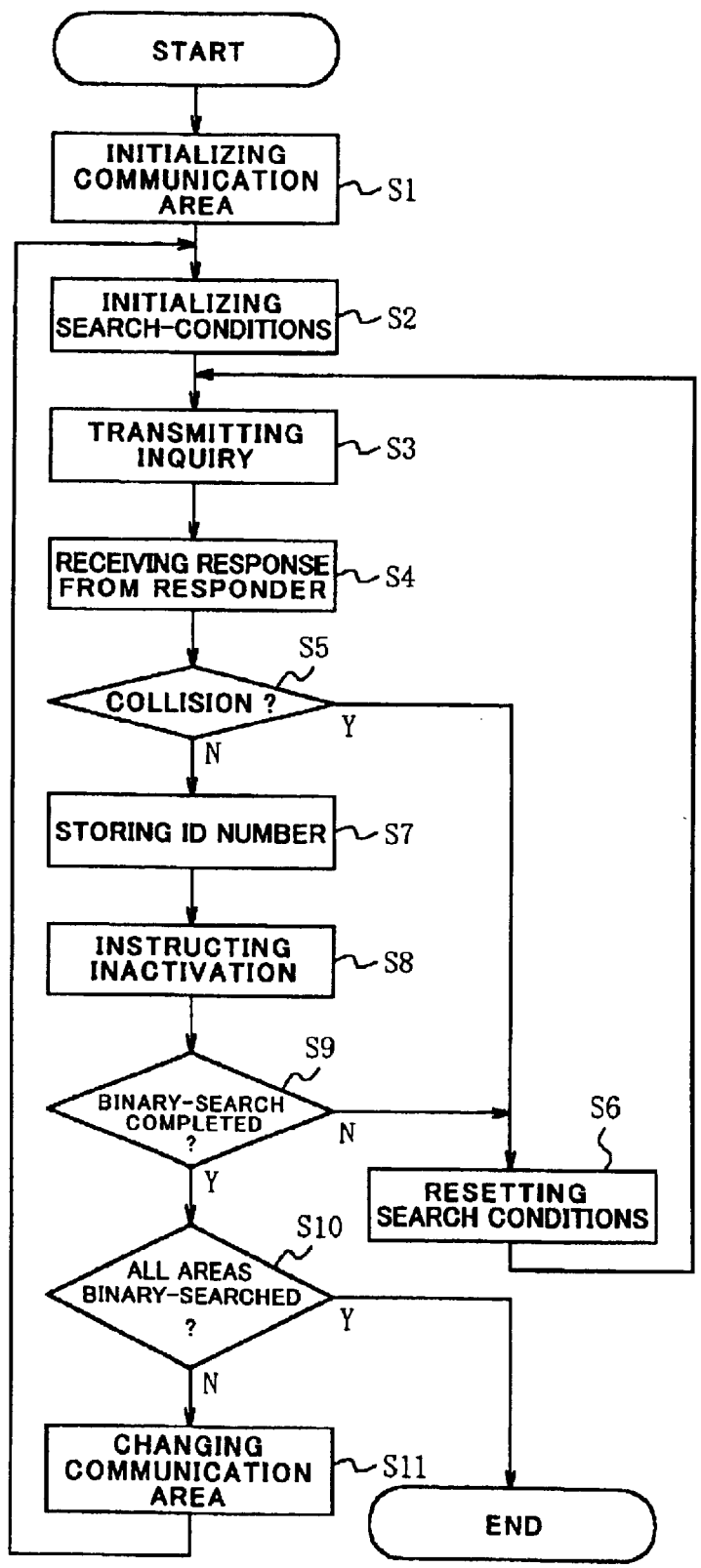
FIG. 6 is a flowchart showing steps to be carried out by the host computer for radio-frequency identification in the RFID system illustrated in FIG. 4.

FIG. 6 is a flowchart showing steps to be carried out by the host computer 31 for radio-frequency identification in the RFID system in accordance with the first embodiment, illustrated in FIG. 4.

First, the control signal CS is initialized for initializing a communication area in which a number space of an identification number is searched, in step S1. Then, the steps S2 to S9 are carried out in the same manner as the steps S2 to S9 having been explained with reference to FIG. 3. Then, it is judged in step S10 in accordance with the control signal CS whether binary-searching has been carried out in all of the communication areas. If not, the control signal CS is changed into another control signal for changing the communication area, in step S11. For instance, the control signal CS associated with the communication area R1 is changed into the control signal CS associated with the communication area R2. Then, the steps S2 to S10 are repeatedly carried out.

A detailed operation of the RFID system in accordance with the first embodiment is explained hereinbelow with reference to FIGS. 4 to 6. It is assumed in the explanation made hereinbelow that the responders 103 to 106 store therein 3-bit identification numbers 001, 011, 101 and 110 unique thereto, respectively, and the responders 103 and 104 exist in a communication area R1 and the responders 105 and 106 exist in a communication area R2.

First, the control signal CS is initialized for initializing a communication area in which a number space of an identification number is searched, in step S1. Thus, the interrogator 21 sets the communication area R1.

Figure 3:
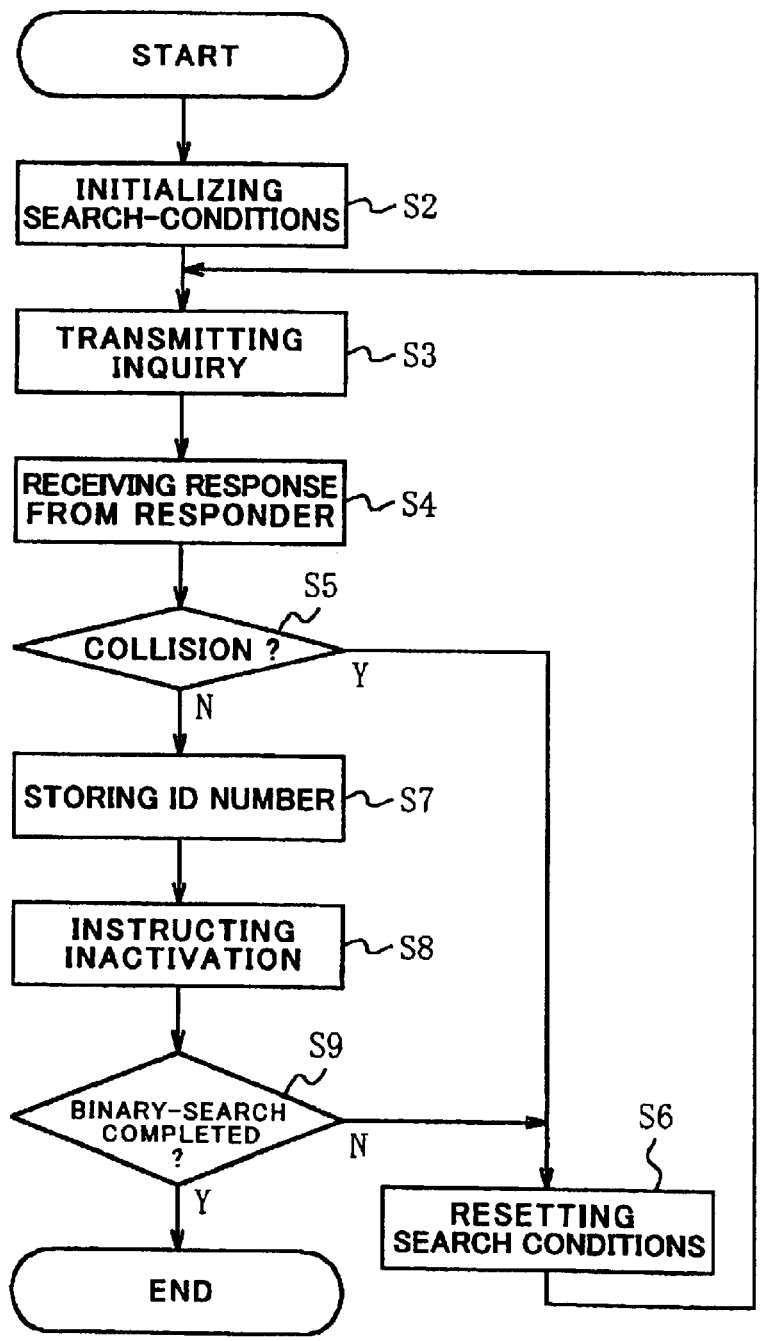
FIG. 3 is a flowchart showing steps to be carried out by the host computer for radio-frequency identification in the RFID system illustrated in FIG. 1.

Then, the steps S2 to S9 are carried out in the same manner as the steps S2 to S9 having been explained with reference to FIG. 3. As a result, the responders 103 and 104 both existing in the communication area R1 are identified, and hence, inactivated.

Then, it is judged in step S10 in accordance with the control signal CS whether the binary-searching has been carried out in all of the communication areas. Since the binary-searching has been carried only in the communication area R1, and the binary-searching is not carried out yet in the communication area R2 (NO in step S10), a communication area in which a number space of an identification number is searched is changed to the communication area R2 from the communication area R1, in step S11.

Then, the steps S2 to S9 are carried out again. That is, the binary-searching is carried out in the communication area R2 in accordance with the search-conditions. Since the responders 103 and 104 existing in both of the communication areas R1 and R2 have been already identified and inactivated, the responders 103 and 104 do not respond to the interrogator 21. Only the responders 105 and 106 existing in the communication area R2, but outside the communication area R1 are identified, and thus, inactivated.

Then, it is judged in step S10 whether the binary-searching has been carried out in all of the communication areas. Since the binary-searching has been carried out in both of the communication areas R1 and R2 (YES in step S10), the binary-searching ends.

Table 2 shows a relation among the search conditions, the response number or the identification number which the interrogator 21 received, a bit at which collision occurs, and the identified responder.

TABLE 2

| Inquiry Transmission No. | Search Conditions | Received Response Number | Bit at which Collision occurs | Identified Responder |
|---|---|---|---|---|
| 1 | XXX | 001, 011 | 1 | |
| 2 | 00X | 001 | | 103 |
| 3 | 01X | 011 | | 104 |
| | CHANGING AREA (R1→R2) | | | |
| 4 | XXX | 101, 110 | 1, 0 | |
| 5 | 10X | 101 | | 105 |
| 6 | 11X | 110 | | 106 |
| | | | | ALL |

The RFID system in accordance with the first embodiment can carry out binary-searching for identification of a responder more rapidly than the conventional RFID system illustrated in FIG. 1. A difference in a period of time necessary for carrying out binary-searching between the conventional RFID system and the RFID system in accordance with the first embodiment increases as a number L of responders increases.

The reason is as follows.

A maximum number N of carrying out binary-searching for identifying one responder among L responders is defined as follows.

$$N = \log_2(L) + 1$$

Accordingly, a maximum number Na of carrying out binary-searching for identifying all of L responders in the conventional RFID system is defined as follows.

$$Na = \sum_{i=1}^{L} \log_2(i) + L$$

In accordance with the first embodiment, L (for instance, 4) responders are separated into M (for instance, 2) groups, and binary-searching is carried out for each of the M groups in order to identify all of the L responders. A maximum number NaM of carrying out binary-searching for identifying all of L responders in the RFID system in accordance with the first embodiment is defined as follows.

$$NaM = M \sum_{i=1}^{\frac{L}{M}} \log_2(i) + L$$

For instance, assuming that a number L of responders is 4 (L=4), a maximum number Na in the conventional RFID system in which a number M of groups is 1 (M=1) is 9 (Na=9), whereas a maximum number NaM in the RFID system in accordance with the first embodiment in which a number M of groups is 2 (M=2) is 6 (NaM=6).

For instance, assuming that a number L of responders is 10 (L=4), a maximum number Na in the conventional RFID system in which a number M of groups is 1 (M=1) is 35 (Na=35), whereas a maximum number NaM in the RFID system in accordance with the first embodiment in which a number M of groups is 2 (M=2) is 26 (NaM=26).

Table 3 shows a difference between maximum numbers Na and NaM for various numbers of responders.

TABLE 3

| No. of Responders | Na (M = 1) | NaM (M = 2) | Difference |
|---|---|---|---|
| 4 | 9 | 6 | 3 |
| 8 | 25 | 18 | 7 |
| 10 | 35 | 26 | 9 |
| 16 | 65 | 50 | 15 |
| 20 | 89 | 60 | 29 |

As is obvious in view of Table 3, a difference in a period of time necessary for carrying out binary-searching in order to identify all of responders between the conventional RFID system and the RFID system in accordance with the first embodiment increases as a number L of responders increases.

In the first embodiment, each of the responders 103 to 106 is designed to have a 3-bit identification number. However, a responder used in an actual RFID system usually has an identification number of 32 to 128 bits, and hence, it takes much time accordingly to identify one responder by carrying out binary-searching. Thus, the RFID system in accordance with the first embodiment is quite useful, because it can shorten a period of time necessary for identifying a responder among a plurality of responders.

In the first embodiment, a communication area in which the interrogator 21 and the responders 103 to 106 can make communication with each other is separated into two areas, that is, the communication areas R1 and R2. However, a number of areas into which the above-mentioned area is separated is not to be limited to two. Any number may be selected among integers equal to 3 or greater (M≧3).

As an example, Table 4 shows a difference between maximum numbers Na and NaM for various numbers of responders which difference is obtained when the above-mentioned is separated into three areas (M=3).

TABLE 4

| No. of Responders | Na (M = 1) | NaM (M = 3) | Difference |
|---|---|---|---|
| 3 | 6 | 3 | 3 |
| 6 | 17 | 9 | 8 |
| 9 | 36 | 18 | 18 |
| 12 | 51 | 27 | 24 |
| 15 | 66 | 39 | 27 |

[Second Embodiment]

Figure 7:
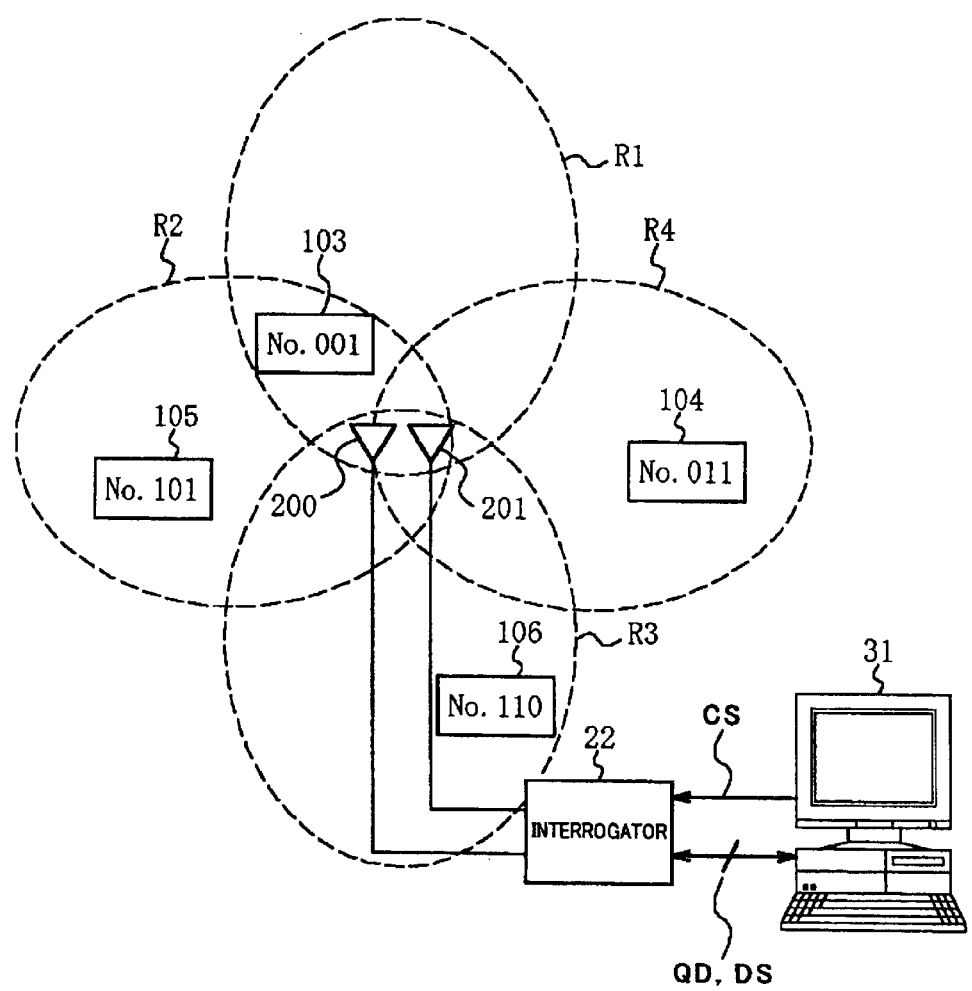
FIG. 7 is a block diagram of the RFID system in accordance with the second embodiment of the present invention.

FIG. 7 is a block diagram of the RFID system in accordance with the second embodiment of the present invention.

The RFID system in accordance with the second embodiment is comprised of a plurality of responders 103 to 106, an interrogator 22, and a host computer 31.

The RFID system in accordance with the second embodiment is structurally different from the RFID system in accordance with the first embodiment in that the RFID system in accordance with the second embodiment has the interrogator 22 in place of the interrogator 21, and the antennas 200 and 201 have directivity. Parts or elements that correspond to those of the RFID system in accordance with the first embodiment have been provided with the same reference numerals, and operate in the same manner as corresponding parts or elements in the first embodiment, unless explicitly explained hereinbelow.

The interrogator 22 in the second embodiment is designed to successively change a communication area in which binary-searching is carried out for identification of a responder, from a communication area R1 to a communication area R4 in turn as if the communication areas R1 to R4 rotate around the antennas 200 and 201.

Figure 8:
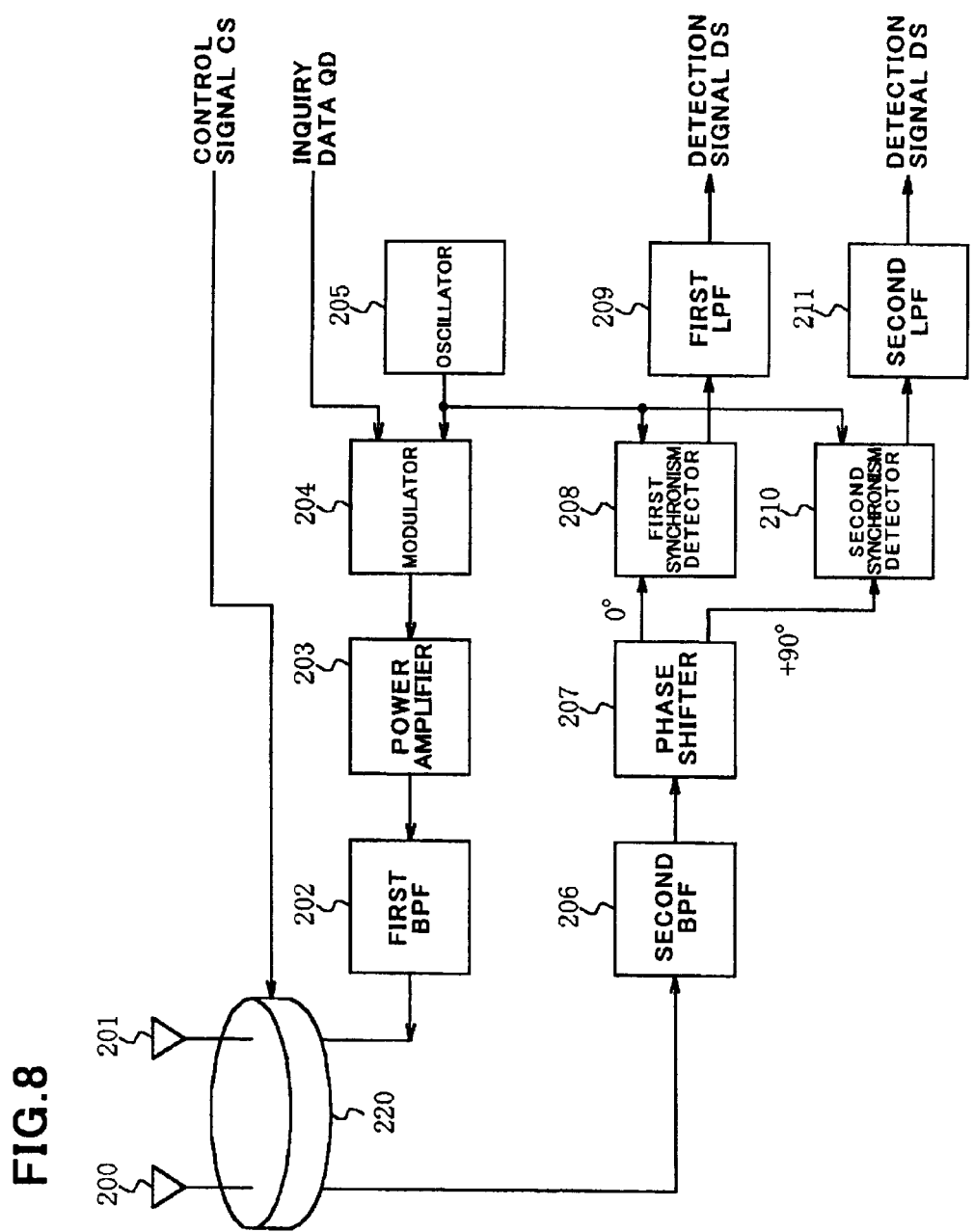
FIG. 8 is a block diagram of a RF block of the interrogator as a part of the RFID system illustrated in FIG. 7.

FIG. 8 is a block diagram of a RF block of the interrogator 22 as a part of the RFID system illustrated in FIG. 7.

Figure 2:
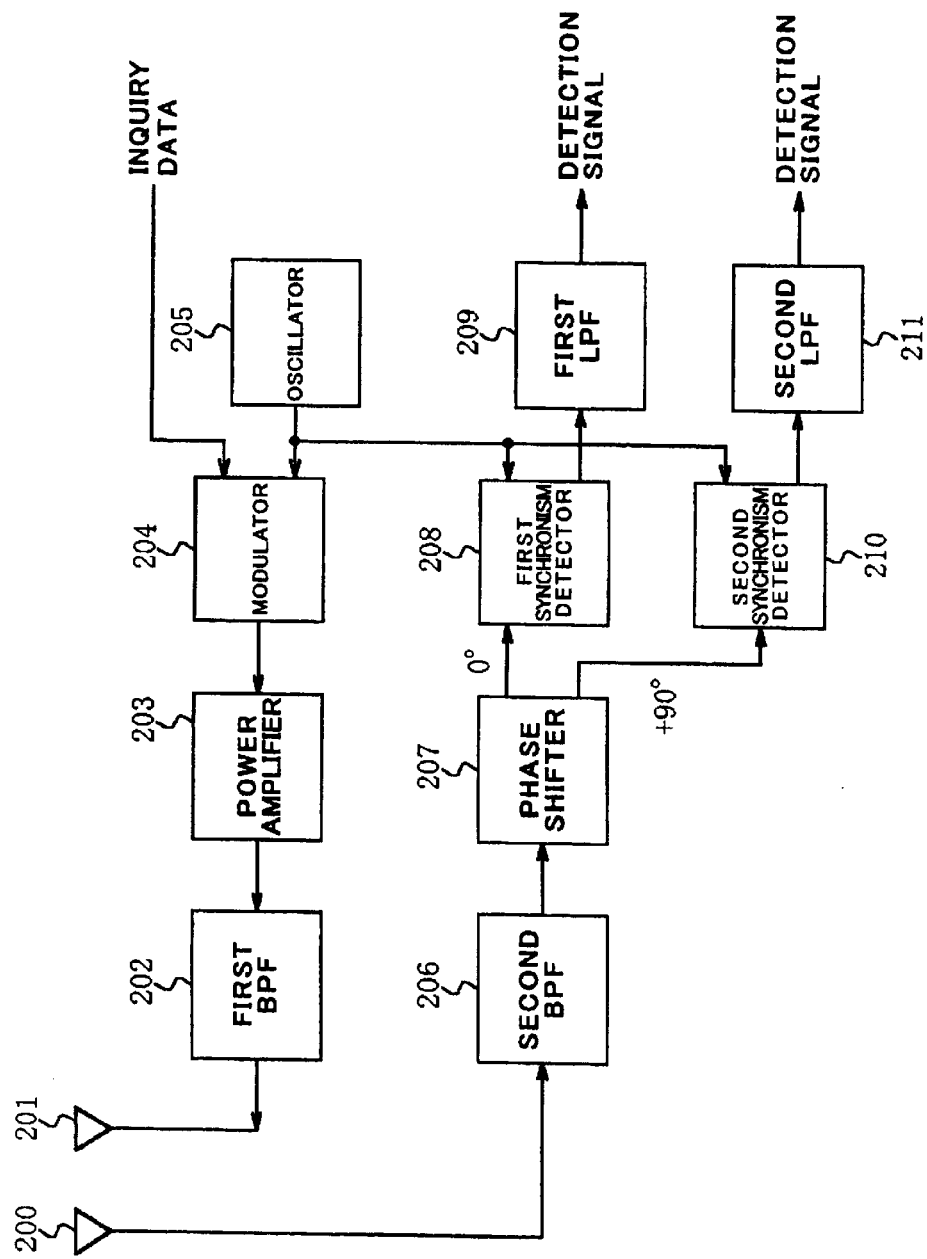
FIG. 2 is a block diagram of a RF block of the interrogator as a part of the RFID system illustrated in FIG. 1.

In comparison with the RF block of the interrogator 20 illustrated in FIG. 2, the RF block of the interrogator 22 in the second embodiment is designed to further include a rotator 220. The rotator 220 rotates the antennas 200 and 201 by 90 degrees in accordance with the control signal CS received from the host computer 30, to thereby change a communication area in which binary-searching is carried out for identification of a responder.

For instance, the rotator 220 rotates the antennas 200 and 201 in an anti-clockwise direction, in which case, the communication areas R1, R2, R3 and R4 are formed in turn in this order. As an alternative, the rotator 220 rotates the antennas 200 and 201 in a clockwise direction, in which case, the communication areas R1, R4, R3 and R2 are formed in turn in this order.

Whereas the communication areas R1 and R2 are formed in a common direction in the first embodiment, the communication areas R1 to R4 are formed on a circle around the antennas 200 and 201 in the second embodiment. Though the second embodiment is different from the first embodiment with respect to where the communication areas are formed, the RFID system in accordance with the second embodiment can carry out binary-searching for identification of a responder in the same way as the RFID system in accordance with the first embodiment. Hence, the RFID system in accordance with the second embodiment provides the same advantages as those obtained by the first embodiment.

In the second embodiment, the antennas 200 and 201 are rotated by 90 degrees. It should be noted that an angle by which the antennas 200 and 201 are rotated is not to be limited to 90 degrees. Any angle may be selected.

[Third Embodiment]

Figure 9:
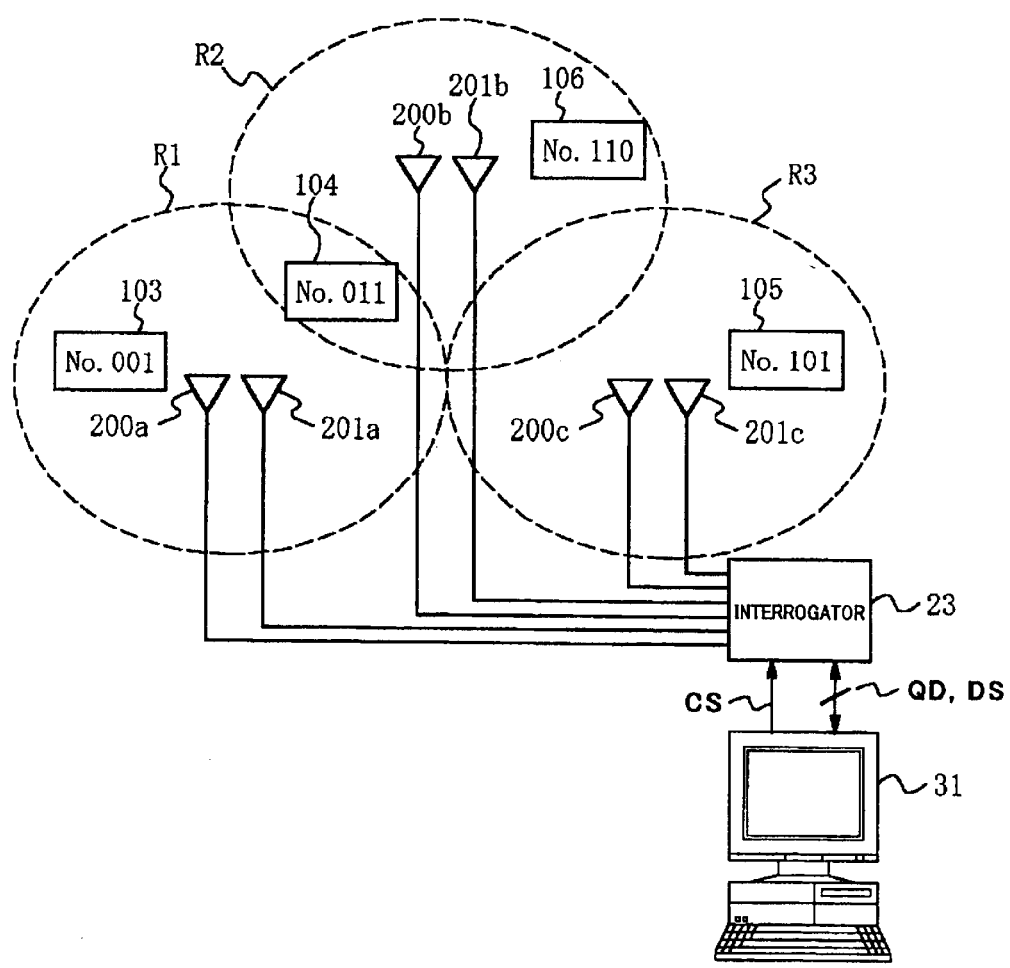
FIG. 9 is a block diagram of the RFID system in accordance with the third embodiment of the present invention.

FIG. 9 is a block diagram of the RFID system in accordance with the third embodiment of the present invention.

The RFID system in accordance with the third embodiment is comprised of a plurality of responders 103 to 106, an interrogator 23, and a host computer 31.

The RFID system in accordance with the third embodiment is structurally different from the RFID system in accordance with the first embodiment only in having the interrogator 23 in place of the interrogator 21. Parts or elements that correspond to those of the RFID system in accordance with the first embodiment have been provided with the same reference numerals, and operate in the same manner as corresponding parts or elements in the first embodiment, unless explicitly explained hereinbelow.

The interrogator 23 in the third embodiment is designed to include three pairs of signal-receiving antennas 200a–200c and signal-transmitting antennas 201a–210c associated areas R1 to R3, respectively. The interrogator 23 selects one of the pairs in accordance with the control signal CS received from the host computer 31, to thereby switch the communication areas R1 to R3 in turn.

Figure 10:
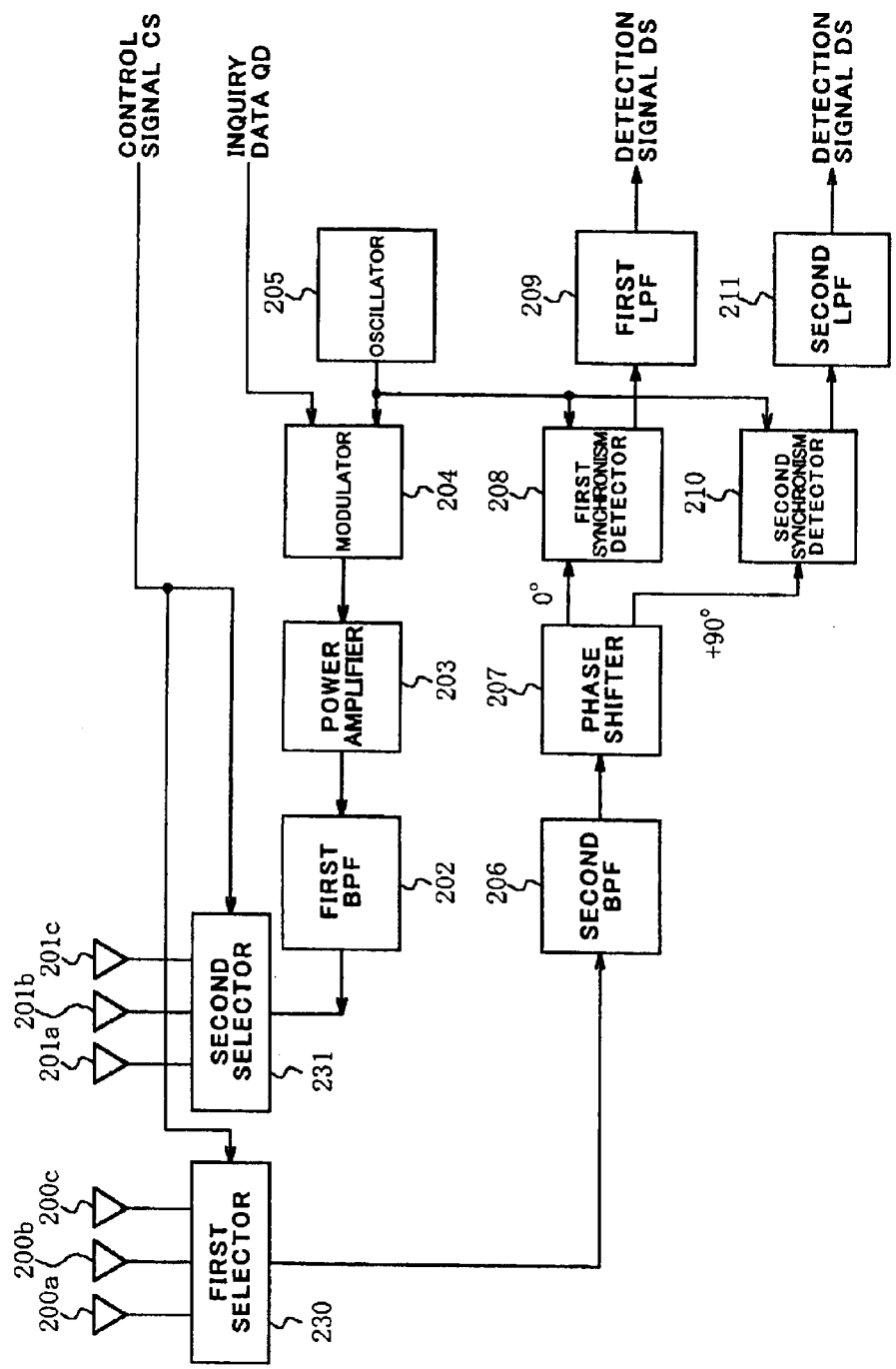
FIG. 10 is a block diagram of a RF block of the interrogator as a part of the RFID system illustrated in FIG. 9.

FIG. 10 is a block diagram of a RF block of the interrogator 23 as a part of the RFID system illustrated in FIG. 9.

In comparison with the RF block of the interrogator 20 illustrated in FIG. 2, the RF block of the interrogator 23 in the third embodiment is designed to further include, in place of the signal-receiving antenna 200 and the signal-transmitting antenna 201, a first pair of a signal-receiving antenna 200a and a signal-transmitting antenna 201a associated with the communication area R1, a second pair of a signal-receiving antenna 200b and a signal-transmitting antenna 201b associated with the communication area R2, a third pair of a signal-receiving antenna 200c and a signal-transmitting antenna 201c associated with the communication area R3, a first selector 230 which selects one of the signal-receiving antennas 200a, 200b and 200c, and a second selector which selects one of the signal-transmitting antennas 201a, 201b and 201c.

The first and second selectors 230 and 231 select one of the signal-receiving antennas 200a, 200b and 200c and one of the signal-transmitting antennas 201a, 201b and 201c, respectively, both in accordance with the control signal CS received from the host computer 31. Hence, the first and second selectors 230 and 231 select the antennas such that the selected antennas make a pair. For instance, if the first selector 230 selects the signal-receiving antenna 200a, the second selector 231 selects the signal-transmitting antenna 201a.

Though the RFID system in accordance with the third embodiment selects a communication area in a different way from the RFID system in accordance with the first embodiment, the RFID system in accordance with the third embodiment provides the same advantages as those obtained by the first embodiment.

[Fourth Embodiment]

Figure 11:
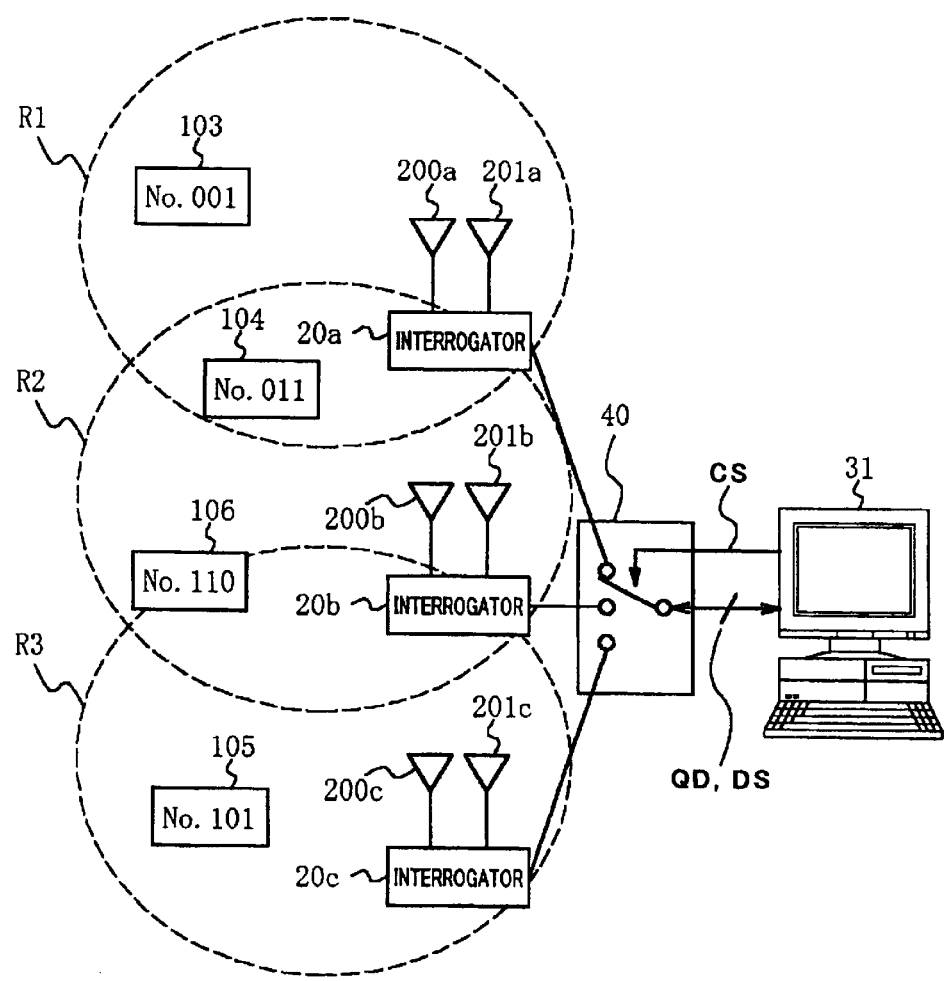
FIG. 11 is a block diagram of the RFID system in accordance with the fourth embodiment of the present invention.

FIG. 11 is a block diagram of the RFID system in accordance with the fourth embodiment of the present invention.

The RFID system in accordance with the fourth embodiment is comprised of a plurality of responders 103 to 106, a plurality of interrogators 20a to 20c, a selector 40, and a host computer 31.

The RFID system in accordance with the fourth embodiment is structurally different from the RFID system in accordance with the first embodiment in further including the selector 40, and further in including a plurality of the interrogators 20a, 20b and 20c in place of the interrogator 21. Parts or elements that correspond to those of the RFID system in accordance with the first embodiment have been provided with the same reference numerals, and operate in the same manner as corresponding parts or elements in the first embodiment, unless explicitly explained hereinbelow.

The interrogators 20a, 20b and 20c in the fourth embodiment is designed to have the same structure as that of the interrogator 21 in the first embodiment, and operate in the same way as the interrogator 21. The interrogators 20a, 20b and 20c form areas R1, R2 and R3, respectively.

The selector 40 receives the control signal CS from the host computer 31, and selects one of the interrogators 20a, 20b and 20c in accordance with the received control signal CS. The thus selected interrogator transmits an inquiry made based on the inquiry data QD received from the host computer 31 through the selector 40, to a responder existing in a communication area formed by the interrogator. Then, the interrogator receives a response number comprised of an identification number from the responder, and transmits the detection signal DS to the host computer 31 through the selector 40.

Specifically, for instance, the selector 40 first selects the interrogator 20a in accordance with the control signal CS received from the host computer 31. Then, the interrogator 20a transmits an inquiry made based on the inquiry data QD received from the host computer 31 through the selector 40, to the responders 103 and 104 existing in the communication area R1 formed by the interrogator 20a. Then, the interrogator 20a receives a response number comprised of an identification number from the responders 103 and 104 in turn, and transmits the detection signals DS to the host computer 31 through the selector 40. Thus, the responders 103 and 104 are identified.

Then, the selector 40 selects the interrogator 20b in accordance with the control signal CS received from the host computer 31. Then, the interrogator 20b transmits an inquiry, to the responder 106 existing in the communication area R2 formed by the interrogator 20b, but outside the communication area R1. Then, the interrogator 20b receives a response number comprised of an identification number from the responder 106, and transmits the detection signals DS to the host computer 31 through the selector 40. Thus, the responder 106 is identified.

Then, the selector 40 selects the interrogator 20c in accordance with the control signal CS received from the host computer 31. Then, the interrogator 20c transmits an inquiry, to the responder 105 existing in the communication area R3 formed by the interrogator 20c, but outside the communication area R2. Then, the interrogator 20c receives a response number comprised of an identification number from the responder 105, and transmits the detection signals DS to the host computer 31 through the selector 40. Thus, all of the responders 103, 104, 105 and 106 are identified.

Though the RFID system in accordance with the fourth embodiment selects a communication area in a different way from the RFID system in accordance with the first embodiment, the RFID system in accordance with the fourth embodiment provides the same advantages as those obtained by the first embodiment.

Though the first to fourth embodiments have been explained independently of one another, it is possible to apply the first or second embodiment to the third or fourth embodiment.

An operation of the host computer 31 can be accomplished by a computer program written in a language readable by a computer.

For operating the host computer 31 by means of a computer program, the host computer 31 is designed to include a memory to store a computer program therein, for instance. The computer program is stored in the memory, and is read out into the host computer 31 when the host computer 31 starts its operation. Thus, such an operation of the host computer 31 as mentioned above is accomplished in accordance with the computer program.

As an alternative, a recording medium storing such a computer program as mentioned above may be set into the host computer 31 to be read out by the host computer 31.

The functions of the host computer 31 may be accomplished as a program including various commands, and be presented through a recording medium readable by a computer.

In the specification, the term "recording medium" means any medium which can record data therein.

The term "recording medium" includes, for instance, a disk-shaped recorder such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk, a memory chip such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM such as a compact flush card, a hard disk, and any other suitable means for storing a program therein.

A recording medium storing a program for accomplishing the above-mentioned apparatus may be accomplished by programming functions of the above-mentioned apparatuses with a programming language readable by a computer, and recording the program in a recording medium such as mentioned above.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2003-050967 filed on Feb. 27, 2003 including specification, claims, drawings and summary is incorporated herein by reference in its entirety.

What is claimed is:

1. A radio-frequency identification system comprising:
  (a) a plurality of responders each of which has a unique identification number, and makes a response in radio-frequency communication to an inquiry transmitted from a later mentioned interrogator;
  (b) an interrogator which makes an inquiry to each of said responders, and receives said response from each of said responders; and
  (c) a host computer which controls communication made between said responders and said interrogator, and binary-searches a number space of said identification number of each of said responders for identifying a responder(s) existing in a communication area in which said responders and said interrogator can make communication with each other,
  said host computer having a function of acting as a discriminator for generating a control signal in accordance with first to N-th communication areas in each of which said responders and said interrogator can make communication with each other, binary-searching said number space in each of said first to N-th communication areas one by one to identify a responder(s) existing therein, and inactivating the thus identified responder(s), wherein N is a positive integer equal to or greater than two, and said function is accomplished by software.

2. The radio-frequency identification system as set forth in claim 1, wherein said host computer binary-searches said number space in each of said first to N-th communication areas in such an order that a smaller area is selected prior to a larger area.

3. The radio-frequency identification system as set forth in claim 2, wherein said smaller area is contained in said larger area.

4. The radio-frequency identification system as set forth in claim 3, wherein said interrogator includes a power amplifier which amplifies power in accordance with said control signal to incrementally increase a level of an output signal transmitted from said interrogator.

5. The radio-frequency identification system as set forth in claim 1, wherein said interrogator includes:
  a signal-transmitting antenna and a signal-receiving antenna both having directivity; and
  a rotator rotating said signal-transmitting and signal-receiving antennas in accordance with said control signal for varying a communication area among said first to N-th communication areas.

6. The radio-frequency identification system as set forth in claim 1, wherein said interrogator includes:
  a plurality of pairs of a signal-transmitting antenna and a signal-receiving antenna; and
  a selector which selects one pair of a signal-transmitting antenna and a signal-receiving antenna among said pairs in accordance with said control signal for varying a communication area among said first to N-th communication areas.

7. The radio-frequency identification system as set forth in claim 1, wherein said radio-frequency identification system includes a plurality of interrogators, and further includes a selector which selects one of said interrogators in accordance with said control signal for varying a communication area among said first to N-th communication areas.

8. A method of carrying out radio-frequency identification in a radio-frequency identification system comprising:
   (A) a plurality of responders each of which has a unique identification number, and makes a response in radio-frequency communication to an inquiry transmitted from a later mentioned interrogator;
   (B) an interrogator which makes an inquiry to each of said responders, and receives said response from each of said responders; and
   (C) a host computer which controls communication made between said responders and said interrogator, and binary-searches a number space of said identification number of each of said responders for identifying a responder(s) existing in a communication area in which said responders and said interrogator can make communication with each other,
   said method including the steps of:
   (a) generating a control signal in accordance with first to N-th communication areas in each of which said responders and said interrogator can make communication with each other, wherein N is a positive integer equal to or greater than two;
   (b) binary-searching said number space in each of said first to N-th communication areas one by one to identify a responder(s) existing therein; and
   (c) inactivating the thus identified responder(s),
   wherein said steps (a), (b) and (c) are carried out by said host computer.

9. The method as set forth in claim 8, wherein said step (b) is carried out in such an order that a smaller area is selected prior to a larger area.

10. The method as set forth in claim 9, wherein said smaller area is contained in said larger area.

11. The method as set forth in claim 10, further including the step of amplifying power in accordance with said control signal to incrementally increase a level of an output signal transmitted from said interrogator.

12. The method as set forth in claim 8, wherein said step (b) is carried out by rotating a signal-transmitting antenna and a signal-receiving antenna of said interrogator in accordance with said control signal for varying a communication area among said first to N-th communication areas, said both signal-transmitting and signal-receiving antennas having directivity.

13. The method as set forth in claim 8, wherein said step (b) is carried out by selecting one pair of a signal-transmitting antenna and a signal-receiving antenna among a plurality of pairs of a signal-transmitting antenna and a signal-receiving antenna of said interrogator in accordance with said control signal for varying a communication area among said first to N-th communication areas.

14. The method as set forth in claim 8, wherein said radio-frequency identification system includes a plurality of interrogators, and said step (b) is carried out by selecting one of said interrogators in accordance with said control signal for varying a communication area among said first to N-th communication areas.

15. The method as set forth in claim 8, further including:
   (d-1) initializing said control signal for initializing said first to N-th communication areas;
   (d-2) initializing binary-search conditions in accordance with which said number space is binary-searched, to turn all of bits into indefinite bits, and designating all of number spaces;
   (d-3) causing said interrogator to transmit an inquiry made in accordance with said binary-search conditions, to said responders;
   (d-4) causing said interrogator to receive a response(s) from a responder(s) having a unique identification number matching to said binary-search conditions;
   (d-5) judging whether response numbers having been received in said interrogator are in collision with one another;
   (d-6) storing a response number which is not in collision with other response numbers, as an identification number of a responder existing in a communication area in which said responders and said interrogator can make communication with each other;
   (d-7) transmitting an instruction to said responder to inactivate said responder;
   (d-8) judging whether binary-searching said number space is completed in accordance with said binary-search conditions;
   (d-9) if binary-searching said number space is judged in said step (k) to be completed, judging whether binary-searching said number space is completed in all of said first to N-th communication areas; and
   (d-10) if binary-searching said number space is judged completed in all of said first to N-th communication areas, finishing binary-searching said number space.

16. The method as set forth in claim 15, further including:
   (e) if said response numbers are judged in said step (d-5) to be in collision with one another, resetting a bit which is in collision with a bit in another response number, into another binary number without resetting a bit which is not in collision with a bit in another response number; and
   (f) repeating said steps (d-3) to (d-10).

17. The method as set forth in claim 15, further including:
   (g) if binary-searching said number space is judged in said step (d-8) not to be completed, resetting a bit which is in collision with a bit in another response number, into another binary number without resetting a bit which is not in collision with a bit in another response number; and
   (h) repeating said steps (d-3) to (d-10).

18. The method as set forth in claim 15, further including:
   (i) if binary-searching said number space is judged in said step (d-9) not to be completed in all of said first to N-th communication areas, varying said control signal for selecting another area among said first to N-th communication areas; and
   (j) repeating said steps (d-2) to (d-10).

19. A program for causing a computer to control communication made between each of a plurality of responders each of which has a unique identification number, and makes a response in radio-frequency communication to an inquiry transmitted from a later mentioned interrogator, and an interrogator which makes an inquiry to each of said responders, and receives said response from each of said responders, and binary-search a number space of said identification number of each of said responders for identifying a responder(s) existing in a communication area in which said responders and said interrogator can make communication with each other, wherein steps executed by said computer in accordance with said program includes:

(a) generating a control signal in accordance with first to N-th communication areas in each of which said responders and said interrogator can make communication with each other, wherein N is a positive integer equal to or greater than two;

(b) binary-searching said number space in each of said first to N-th communication areas one by one to identify a responder(s) existing therein; and (c) inactivating the thus identified responder(s).

20. The program as set forth in claim 19, wherein said step (b) is carried out in such an order that a smaller area is selected prior to a larger area.

21. The program as set forth in claim 20, wherein said smaller area is contained in said larger area.

22. The program as set forth in claim 21, wherein said steps executed by said computer in accordance with said program further includes amplifying power in accordance with said control signal to incrementally increase a level of an output signal transmitted from said interrogator.

23. The program as set forth in claim 19, wherein said step (b) is carried out by rotating a signal-transmitting antenna and a signal-receiving antenna of said interrogator in accordance with said control signal for varying a communication area among said first to N-th communication areas, said both signal-transmitting and signal-receiving antennas having directivity.

24. The program as set forth in claim 19, wherein said step (b) is carried out by selecting one pair of a signal-transmitting antenna and a signal-receiving antenna among a plurality of pairs of a signal-transmitting antenna and a signal-receiving antenna of said interrogator in accordance with said control signal for varying a communication area among said first to N-th communication areas.

25. The program as set forth in claim 19, wherein said step (b) is carried out by selecting one of said interrogators in accordance with said control signal for varying a communication area among said first to N-th communication areas.

26. The program as set forth in claim 19, wherein said steps executed by said computer in accordance with said program further includes:

(d-1) initializing said control signal for initializing said first to N-th communication areas;

(d-2) initializing binary-search conditions in accordance with which said number space is binary-searched, to turn all of bits into indefinite bits, and designating all of number spaces;

(d-3) causing said interrogator to transmit an inquiry made in accordance with said binary-search conditions, to said responders;

(d-4) causing said interrogator to receive a response(s) from a responder(s) having a unique identification number matching to said binary-search conditions;

(d-5) judging whether response numbers having been received in said interrogator are in collision with one another;

(d-6) storing a response number which is not in collision with other response numbers, as an identification number of a responder existing in a communication area in which said responders and said interrogator can make communication with each other;

(d-7) transmitting an instruction to said responder to inactivate said responder;

(d-8) judging whether binary-searching said number space is completed in accordance with said binary-search conditions;

(d-9) if binary-searching said number space is judged in said step (k) to be completed, judging whether binary-searching said number space is completed in all of said first to N-th communication areas; and (d-10) if binary-searching said number space is judged completed in all of said first to N-th communication areas, finishing binary-searching said number space.

27. The program as set forth in claim 26, wherein said steps executed by said computer in accordance with said program further includes:

(e) if said response numbers are judged in said step (d-5) to be in collision with one another, resetting a bit which is in collision with a bit in another response number, into another binary number without resetting a bit which is not in collision with a bit in another response number; and (f) repeating said steps (d-3) to (d-10).

28. The program as set forth in claim 26, wherein said steps executed by said computer in accordance with said program further includes:

(g) if binary-searching said number space is judged in said step (d-8) not to be completed, resetting a bit which is in collision with a bit in another response number, into another binary number without resetting a bit which is not in collision with a bit in another response number; and (h) repeating said steps (d-3) to (d-10).

29. The program as set forth in claim 26, wherein said steps executed by said computer in accordance with said program further includes:

(i) if binary-searching said number space is judged in said step (d-9) not to be completed in all of said first to N-th communication areas, varying said control signal for selecting another area among said first to N-th communication areas; and (j) repeating said steps (d-2) to (d-10).

* * * * *